Feb. 20, 1940.  A. W. ROSEN  2,191,085
CLAMPING MEANS FOR MIRRORS FOR MOTOR VEHICLES
Filed Sept. 14, 1939
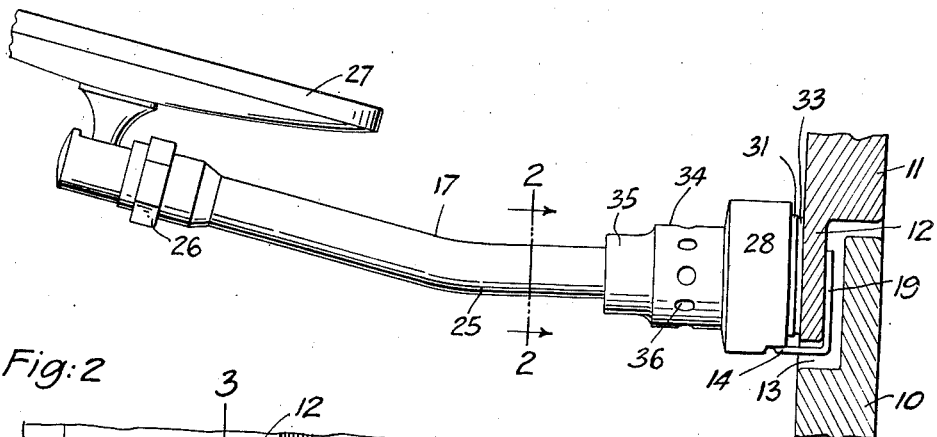
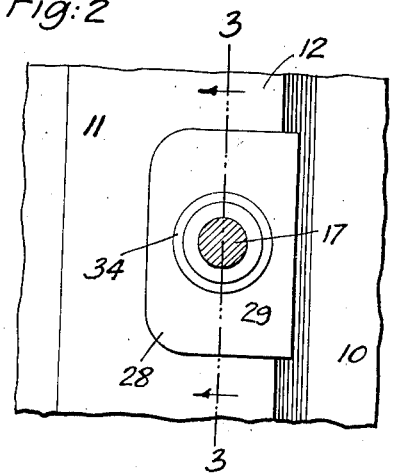
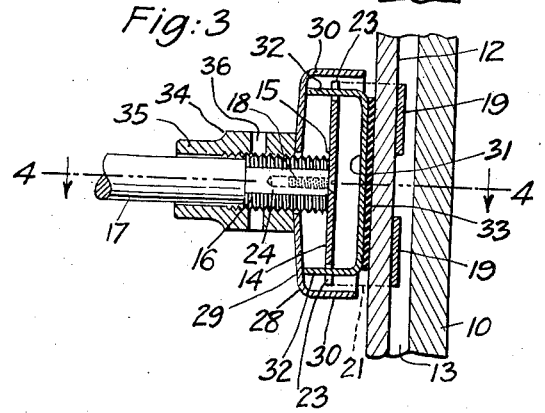
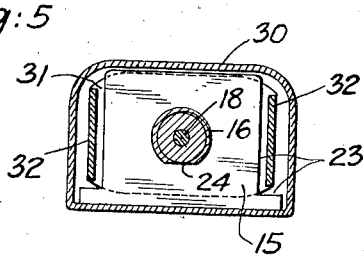
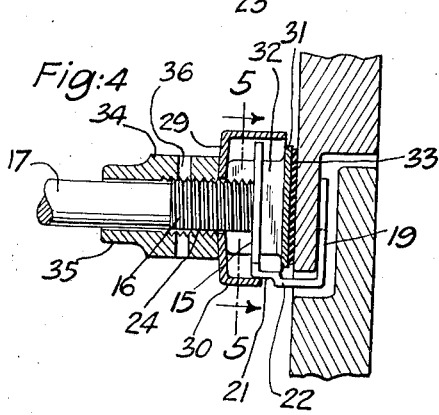
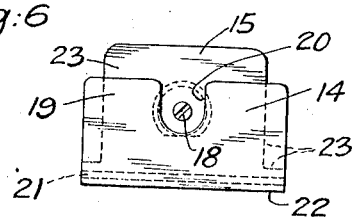
INVENTOR:
ABRAHAM W. ROSEN
BY Walter E. Wallheim
ATTORNEY.

Patented Feb. 20, 1940

2,191,085

UNITED STATES PATENT OFFICE 2,191,085

CLAMPING MEANS FOR MIRRORS FOR MOTOR VEHICLES

Abraham W. Rosen, New York, N. Y.

Application September 14, 1939, Serial No. 294,813

4 Claims. (Cl. 248—226)

This invention relates to clamping means for holding rear vision mirrors of motor vehicles in place and is an improvement over the means disclosed in Patent #2,109,142 issued to me on February 22, 1938.

It is the principal object of the invention to provide mirrors of the kind shown in the aforesaid patent and also in Patent #1,816,700 issued to me on July 28, 1931, with clamping means which will effectually position and support the mirror against displacement through vibration and opening and closing and inadvertent slamming of the door, and which means are operable by a single locking member making its attachment especially simple and readily accomplished.

A further object is to provide in such clamping means, a simple and inexpensive construction, attractive in appearance, and dependable in use.

With these and other objects in view, a preferred embodiment of the invention is shown in the accompanying drawing in which Fig. 1 is a plan view of a mirror clamped to the door frame of a motor vehicle, a fragmentary sectional view of which is shown;

Fig. 2 is an elevational view, partly in section, taken along the plane of line 2—2 in Fig. 1;

Fig. 3 is a longitudinal sectional view, partly in elevation, taken along the plane of line 3—3 in Fig. 2;

Fig. 4 is a cross-sectional view, partly in elevation, taken along the plane of line 4—4 in Fig. 3;

Fig. 5 is a longitudinal sectional view taken along the plane of line 5—5 in Fig. 4;

Fig. 6 is an end view of a principal bracket member.

Like characters of reference denote similar parts throughout the several views and the following specification.

10 is a jamb for a door 11 of a motor vehicle. 12 is a laterally extending flange of the door which extends into a recess 13 of the jamb. These parts are shown more or less diagrammatically and for the purpose of illustrating a typical application of the invention only.

14 is a bracket member, essentially U shaped, having one leg 15 fastened rigidly to a threaded extension 16 of a rod 17 by means of, preferably, a screw 18. Its other leg 19 is cut out at 20 for the purpose of permitting convenient access to the screw 18. A base 21 connecting legs 15 and 19 is stepped at 22. At both sides, leg 15 is reduced in width at 23.

The threaded extension 16 is provided with a flat 24. The rod 17 is preferably bent at 25 and has fastened to it by means of a ball and socket joint 26 a mirror 27. The details of the joint 26 are substantially the same as those shown in Patent #1,816,700 issued to me on July 28, 1931.

28 is an elongated cup-shaped housing having a base 29 and sides 30 extending therefrom. Base 29 has a D shaped opening in its center to permit the base to pass snugly, but slidingly and non-rotatably, over the outside diameter of the threaded extension 16 of the rod 17 and over its flat 24. One of the sides 30 is somewhat shorter and fits over the base 21 of the bracket member 14 adjacent its stepped-up portion 22.

31 is a compression plate having ears 32 at substantially right angles straddling the sides 23 of the bracket 14 and with their ends abutting the base 29 of housing 28. 33 is a rubber washer or cushion fastened to the outer surface of plate 31.

34 is a locking member engaging the threaded extension 16 of rod 17 and being extended at 35 to fit loosely over rod 17. 36 are transverse openings through the member 34 for the purpose of inserting a nail or prong of a wrench to facilitate turning of the locking member upon the threaded extension.

The entire mirror assembly is readily applied to the motor vehicle by simply slipping the outer leg 19 of the bracket 14 over the inside surface of the flange 12 of the door 11. Then drawing the locking member 34 against the base 29 of the housing 28 by screwing it upon the extension 16 of the rod 17, forces the housing toward the flange of the door and the plate 31 with its washer 33 against the outside surface of the flange 12 by virtue of the ears 32 which abut the inside of the housing base 29.

It is obvious that by simply turning the single locking member 34 as just described the entire assembly can be securely locked upon the flange of the door or other part of the vehicle if so preferred. After locking the assembly, the position of the mirror can be adjusted to any desired angle.

It is understood that various changes in form, proportions and minor details of construction may be resorted to without departing from the principles or sacrificing any of the advantages of the invention as defined in the appended claims.

What I claim as new is:

1. A clamp for a mirror assembly for automobiles consisting of a U shaped bracket having one of its legs rigidly connected to a mirror carrying rod and its other leg placed over a support, a compression plate between the said legs having ears over the sides of the said rigidly connected leg, a resilient washer over the said plate, a housing over the said bracket and plate fitted non-rotatably and slidably over the said rod, and single locking means to force the said housing against the ears of the said plate and simultaneously clamp the support between one leg of the said bracket and the said washer.

2. A clamp for a mirror assembly for automobiles consisting of a U shaped bracket having one of its legs rigidly connected to a mirror carrying rod, a threaded extension to the said rod, the said bracket having its other leg placed over a support, a compression plate between the said legs having ears over the sides of the said rigidly connected leg, a resilient washer over the said plate, a housing over the said bracket and plate fitted non-rotatably and slidably over the said extension, and a locking member threadedly engaging the said extension to force the said housing against the ears of the said plate and simultaneously clamp the support between one leg of the said bracket and the said washer.

3. A clamp for a mirror assembly for automobiles consisting of a U shaped bracket having one of its legs rigidly connected to a mirror carrying rod, a threaded extension to the said rod having a flattened portion extending longitudinally thereupon, the said bracket having its other leg placed over a support, a compression plate between the said legs having ears over the sides of the said rigidly connected leg, a resilient washer over the said plate, a housing over the said bracket and plate provided with a D shaped opening to fit non-rotatably and slidably over the said extension, and a locking member threadedly engaging the said extension to force the said housing against the ears of the said plate and simultaneously clamp the support between one leg of the said bracket and the said washer.

4. A clamp for a mirror assembly for automobiles consisting of a U shaped bracket having two legs and a base, one of its leg rigidly connected to a mirror carrying rod and its other leg placed over a support, a compression plate between the said legs having ears over the sides of the said rigidly connected leg, a resilient washer over the said plate, a housing having side walls over the said bracket and plate, fitted non-rotatably and slidably over the said rod, the base of the said bracket engaging one of the said side walls, and a single locking member to force the said housing against the ears of the said plate and simultaneously clamp the support between one leg of the said bracket and the said washer.

ABRAHAM W. ROSEN.